(12) United States Patent
Gutierrez et al.

(10) Patent No.: US 12,314,760 B2
(45) Date of Patent: May 27, 2025

(54) GARBAGE COLLECTING WAVEFRONT

(71) Applicant: ADVANCED MICRO DEVICES, INC., Santa Clara, CA (US)

(72) Inventors: Anthony Gutierrez, Bellevue, WA (US); Sooraj Puthoor, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 582 days.

(21) Appl. No.: 17/485,662

(22) Filed: Sep. 27, 2021

(65) Prior Publication Data
US 2023/0097115 A1    Mar. 30, 2023

(51) Int. Cl.
*G06F 9/50*    (2006.01)
*G06F 9/38*    (2018.01)
*G06F 12/02*    (2006.01)

(52) U.S. Cl.
CPC .......... *G06F 9/5005* (2013.01); *G06F 9/3851* (2013.01); *G06F 9/3887* (2013.01); *G06F 9/3888* (2023.08); *G06F 12/0253* (2013.01); *G06F 2212/702* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 7,773,090 B1* | 8/2010 | Diard | G06T 15/005 345/522 |
| 9,507,637 B1* | 11/2016 | Saville, III | G06F 9/5016 |
| 10,037,145 B1* | 7/2018 | Hudson | G06F 12/0269 |
| 11,086,630 B1* | 8/2021 | Ward | G06F 9/4812 |
| 11,625,181 B1* | 4/2023 | Bernat | G06F 3/0644 711/154 |
| 2002/0095453 A1* | 7/2002 | Steensgaard | G06F 12/0269 718/107 |
| 2004/0128654 A1* | 7/2004 | Dichter | G06F 11/3423 714/E11.2 |
| 2004/0236712 A1* | 11/2004 | Cotner | G06F 9/4493 |
| 2005/0033781 A1* | 2/2005 | Dussud | G06F 12/0269 |
| 2006/0184723 A1* | 8/2006 | Sinclair | G06F 12/0246 711/E12.008 |
| 2006/0259489 A1* | 11/2006 | Bernabeu-Auban | G06F 9/5016 707/999.009 |
| 2008/0034164 A1* | 2/2008 | Dai | G06F 9/522 711/141 |

(Continued)

*Primary Examiner* — Adam Lee

(57) ABSTRACT

A processing system executes a specialized wavefront, referred to as a "garbage collecting wavefront" or GCWF, to identify and deallocate resources such as, for example, scalar registers, vector registers, and local data share space, that are no longer being used by wavefronts of a workgroup executing at the processing system (i.e., dead resources). In some embodiments, the GCWF is programmed to have compiler information regarding the resource requirements of the other wavefronts of the workgroup and specifies the program counter after which there will be a permanent drop in resource requirements for the other wavefronts. In other embodiments, the standard compute wavefronts signal the GCWF when they have completed using resources. The GCWF sends a command to deallocate the dead resources so the dead resources can be made available for additional wavefronts.

23 Claims, 9 Drawing Sheets

(56) References Cited

U.S. PATENT DOCUMENTS

| | | | |
|---|---|---|---|
| 2008/0147757 A1* | 6/2008 | Duffy | G06F 12/0253 |
| 2009/0150633 A1* | 6/2009 | Lee | G06F 12/023 |
| | | | 711/E12.006 |
| 2010/0242026 A1* | 9/2010 | Bates | G06F 11/362 |
| | | | 717/124 |
| 2011/0131586 A1* | 6/2011 | Jones | G06F 9/544 |
| | | | 718/107 |
| 2011/0153691 A1* | 6/2011 | Allen | G06F 12/0253 |
| | | | 711/170 |
| 2012/0331147 A1* | 12/2012 | Dutta | G06F 9/5088 |
| | | | 709/226 |
| 2013/0117750 A1* | 5/2013 | Howes | G06F 9/524 |
| | | | 718/102 |
| 2013/0159623 A1* | 6/2013 | Loh | G06F 3/0685 |
| | | | 711/E12.009 |
| 2014/0026143 A1* | 1/2014 | Suzuki | G06F 9/52 |
| | | | 718/104 |
| 2014/0075165 A1* | 3/2014 | Chen | G06F 9/322 |
| | | | 712/E9.038 |
| 2014/0365752 A1* | 12/2014 | Howes | G06F 8/458 |
| | | | 712/220 |
| 2015/0317157 A1* | 11/2015 | Gruber | G06F 9/3009 |
| | | | 712/22 |
| 2016/0267621 A1* | 9/2016 | Liao | G06T 1/20 |
| 2016/0285970 A1* | 9/2016 | Cai | H04L 69/162 |
| 2017/0053374 A1* | 2/2017 | Howes | G06F 3/0683 |
| 2017/0083474 A1* | 3/2017 | Meswani | G06F 12/0862 |
| 2017/0199741 A1* | 7/2017 | Shah | G06F 9/30058 |
| 2017/0344473 A1* | 11/2017 | Gidra | G06F 12/0269 |
| 2018/0329805 A1* | 11/2018 | Kurian | G06F 9/5005 |
| 2019/0163490 A1* | 5/2019 | Silberman | G06F 9/3867 |
| 2020/0176065 A1* | 6/2020 | Jung | G06F 12/0253 |
| 2020/0379820 A1* | 12/2020 | Dutu | G06F 9/485 |
| 2020/0409731 A1* | 12/2020 | Zhang | G06F 9/5016 |
| 2021/0034494 A1* | 2/2021 | Vishwakarma | G06F 3/0689 |
| 2021/0191770 A1* | 6/2021 | Rao | G06F 9/3877 |

* cited by examiner

GARBAGE COLLECTING WAVEFRONT

BACKGROUND

Processing systems often include a parallel processor to process graphics and perform video processing operations, to perform machine learning operations, and so forth. In order to efficiently execute such operations, the parallel processor divides the operations into threads and groups of similar threads, such as similar operations on a vector or array of data, into sets of threads referred to as wavefronts. The parallel processor executes the threads of one or more wavefronts in parallel at different compute units of the parallel processor. Processing efficiency of the parallel processor can be enhanced by increasing the number of wavefronts that are executing or ready to be executed at the compute units at a given point in time. However, the number of wavefronts that can be executed is limited by the resources available at the parallel processor, such as register files used by the compute units to execute the corresponding threads and local data storage.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
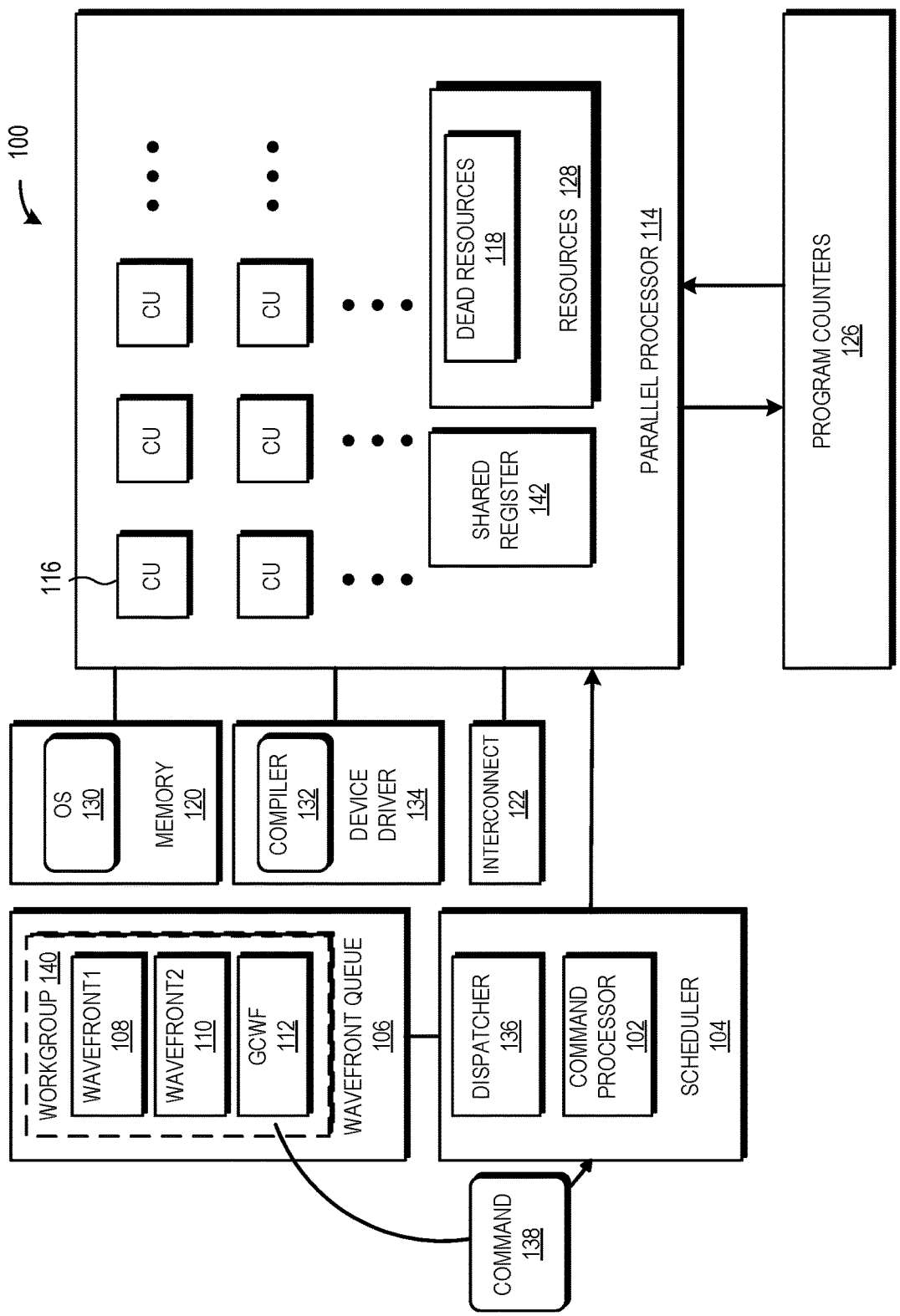
FIG. 1 is a block diagram of a processing system configured to execute a garbage collecting wavefront to identify and deallocate resources of a parallel processor that are no longer being used by a wavefront in accordance with some embodiments.

Parallel processing is resource limited, in that there must be sufficient register file space, local data share (LDS) memory, and wavefront slots available before a kernel can be launched to a parallel processor. However, there is often an imbalance in resource availability such that some resources are exhausted while other resources are left underutilized. For example, compute kernels in some instances require many vector and scalar registers while requiring relatively few wavefront slots and little or no LDS space. Current parallel processors require all the resources needed by a kernel to be available before the kernel can be dispatched, and all the resources used by a kernel are allocated for entire duration of the kernel's execution. Thus, kernels are conventionally allocated resources based on peak demand, whereas after reaching peak demand, kernels significantly underutilize resources.

FIGS. 1-9 illustrate systems, apparatuses, and techniques for identifying and releasing resources of a parallel processor of a processing system that are no longer being used by wavefronts of a workgroup prior to the workgroup completing execution. The processing system executes a specialized wavefront, referred to herein as a "garbage collecting wavefront" or "GCWF", to identify and deallocate resources such as, for example, scalar registers, vector registers, and local data share space, that are no longer being used by wavefronts of a workgroup.

In some embodiments, a compiler generates the GCWF to be executed as part of a workgroup of standard compute wavefronts. The compiler programs the GCWF to have knowledge of the resource requirements of the other wavefronts of the workgroup and specifies the program counter after which there will be a permanent drop in resource requirements for the other wavefronts. In some embodiments, the other wavefronts of the workgroup are passive with respect to the GCWF, in that they do not actively communicate with the GCWF. Instead, the compiler programs the GCWF to periodically query the program counters of the other (peer) wavefronts of the workgroup. Based on the compiler information regarding the resource requirements of the peer wavefronts, timing of the peer wavefronts' execution, and the program counters, the GCWF determines when particular resources will not be subsequently used by any wavefronts of the workgroup (referred to herein as "dead" resources) and sends a command to a resource allocation unit (also referred to as a scheduler) of the processing system to release the dead resources. If the resources to be deallocated are not contiguous, in some embodiments, the GCWF or the compiler reallocates resources to force the available resources, including the deallocated dead resources, to be contiguous.

In some embodiments, the standard compute wavefronts of the workgroup signal to the GCWF that they no longer require certain resources of the processing system. For example, in some embodiments the standard compute wavefronts write to a shared state, such as a register in the wavefront state, that the GCWF consumes. In response to receiving the signal, the GCWF sends a command to the resource allocation unit to release the dead resources.

Because standard compute wavefronts are homogenous, they have the same resource requirements and could therefore complete use of resources at the same time. To avoid serializing messages to the resource allocation unit, in some embodiments, the GCWF batches commands to the resource allocation unit. For example, in some embodiments, the GCWF batches commands to the resource allocation unit based on a threshold, such as a number of wavefronts requiring resource deallocation. In other embodiments, the GCWF batches commands to the resource allocation unit based on a timeout mechanism, in which the GCWF periodically sends commands to free dead resources.

In some embodiments, rather than including the GCWF in a workgroup with standard compute wavefronts, the GCWF uses a specialized wavefront slot that is only used with GCWFs or a general wavefront slot that has a bit set to indicate that it is performing garbage collection. In some embodiments, a wavefront scheduler assigns a low priority to GCWF slots, for example, by scheduling GCWF slots so that the GCWF re-executes every N cycles, where N is a number of cycles that is set empirically at dispatch based on the known frequency at which resource deallocation occurs for a given GCWF or, in other embodiments, N is a fixed value.

FIG. 1 illustrates a block diagram of a processing system 100 including a parallel processor 114 that implements garbage collecting wavefronts to identify and deallocate resources of the processing system that are no longer being used by wavefronts of a workgroup that are still executing at the processing system in accordance with some embodiments. The processing system 100 supports the execution of computer instructions at an electronic device, such as a desktop computer, laptop computer, server, game console, smartphone, tablet, and the like. In some embodiments, the processing system 100 includes additional components not illustrated at FIG. 1, including one or more additional parallel processors, memory modules external to the processing system, and the like, that together support the execution of computer instructions.

A parallel processor is a processor that is able to execute a single instruction on multiple data or threads in a parallel manner. Examples of parallel processors include processors such as graphics processing units (GPUs), massively parallel processors, single instruction multiple data (SIMD) architecture processors, and single instruction multiple thread (SIMT) architecture processors for performing graphics, machine intelligence or compute operations. In some implementations, parallel processors are separate devices that are included as part of a computer. In other implementations such as advance processor units, parallel processors are included in a single device along with a host processor such as a central processor unit (CPU). The embodiments and implementations described below are applicable to both GPUs and other types of parallel processors.

To support execution of operations, the processing system 100 includes a scheduler 104 and a wavefront queue 106. The scheduler 104 includes a dispatcher 136 and a command processor (CP) 102. The dispatcher 136 assigns unique IDs to each dispatched wavefront and maintains a list of available resources 128. The CP 102 delineates the operations to be executed at the parallel processor 114. In particular, the CP 102 receives commands (e.g., draw commands) from another processing unit (not shown) such as a central processing unit (CPU). Based on a specified command architecture associated with the parallel processor 114, the CP 102 interprets a received command to generate one or more sets of operations, wherein each set of operations is referred to herein as a wavefront (also referred to as a warp or a thread). Thus, each wavefront is a set of data that identifies a corresponding set of operations to be executed by the parallel processor 114, including operations such as memory accesses, mathematical operations, communication of messages to other components of the processing system 100, and the like. The CP 102 stores each wavefront (e.g., wavefronts 108, 110) at the wavefront queue 106.

The parallel processor 114 executes commands and programs for selected functions, such as graphics operations and other operations that are particularly suited for parallel processing. In general, parallel processor 114 is frequently used for executing graphics pipeline operations, such as pixel operations, geometric computations, and rendering an image to a display. In some embodiments, the parallel processor 114 also executes compute processing operations (e.g., those operations unrelated to graphics such as video operations, physics simulations, computational fluid dynamics, etc.), based on commands or instructions received from the CPU (not shown). For example, such commands include special instructions that are not typically defined in the instruction set architecture (ISA) of the parallel processor 114. In some embodiments, the parallel processor 114 receives an image geometry representing a graphics image, along with one or more commands or instructions for rendering and displaying the image. In various embodiments, the image geometry corresponds to a representation of a two-dimensional (2D) or three-dimensional (3D) computerized graphics image.

In various embodiments, the parallel processor 114 includes one or more compute units (CUs), such as CU 116, that include one or more single-instruction multiple-data (SIMD) units (not shown) that are each configured to execute a thread concurrently with execution of other threads in a wavefront by other SIMD units, e.g., according to a SIMD execution model. The SIMD execution model is one in which multiple processing elements share a single program control flow unit and program counters 126 and thus execute the same program but are able to execute that program with different data. The CUs 116 are also referred to as shader cores or streaming multi-processors (SMXs). The number of CUs 116 implemented in the parallel processor 114 is configurable. Each CU 116 includes one or more processing elements such as scalar and or vector floating-point units, arithmetic and logic units (ALUs), and the like. In various embodiments, the CUs 116 also include special-purpose processing units (not shown), such as inverse-square root units and sine/cosine units.

Each of the one or more CUs 116 executes a respective instantiation of a particular work item to process incoming data, where the basic unit of execution in the one or more CUs 116 is a work item (e.g., a thread). Each work item represents a single instantiation of, for example, a collection of parallel executions of a kernel invoked on a device by a command that is to be executed in parallel. As referred to herein, a kernel is a function containing instructions declared in a program and executed on an accelerated processing device (APD) CU 116. A work item executes at one or more processing elements as part of a workgroup executing at a CU 116.

The parallel processor 114 executes work-items, such as groups of threads executed simultaneously as a "wavefront", on a single SIMD unit. Wavefronts, in at least some embodiments, are interchangeably referred to as warps, vectors, or threads. In some embodiments, wavefronts include instances of parallel execution of a shader program, where each wavefront includes multiple work items that execute simultaneously on a single SIMD unit in line with the SIMD paradigm (e.g., one instruction control unit executing the same stream of instructions with multiple data). The scheduler 104 is configured to perform operations related to scheduling various wavefronts on different CUs 116 and SIMD units and performing other operations to orchestrate various tasks on the parallel processor 114.

To reduce latency associated with off-chip memory access, various parallel processor architectures include resources 128 such as a memory cache hierarchy (not shown) including, for example, L1 cache and a local data share (LDS). The LDS is a high-speed, low-latency memory private to each CU 116. In some embodiments, the LDS is a full gather/scatter model so that a workgroup writes anywhere in an allocated space.

The parallelism afforded by the one or more CUs 116 is suitable for graphics-related operations such as pixel value calculations, vertex transformations, tessellation, geometry shading operations, and other graphics operations. A graphics processing pipeline (not shown) accepts graphics processing commands from the CPU and thus provides computation tasks to the one or more CUs 116 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD units in the one or more CUs 116 to process such data elements in parallel.

A driver, such as device driver 134, communicates with a device (e.g., parallel processor 114) through an interconnect or the communications infrastructure 122. When a calling program invokes a routine in the device driver 134, the device driver 134 issues commands to the device. Once the device sends data back to the device driver 134, the device driver 134 invokes routines in an original calling program. In general, device drivers are hardware-dependent and operating-system-specific to provide interrupt handling required for any necessary asynchronous time-dependent hardware interface. In some embodiments, a compiler 132 is embedded within device driver 134. The compiler 132 compiles source code into program instructions as needed for execution by the processing system 100. During such compilation, the compiler 132 applies transforms to program instructions at various phases of compilation. In other embodiments, the compiler 132 is a stand-alone application. In various embodiments, the device driver 134 controls operation of the parallel processor 114 by, for example, providing an application programming interface (API) to software executing at the CPU to access various functionality of the parallel processor 114.

Within the processing system 100, the memory 120 includes non-persistent memory, such as DRAM (not shown). In various embodiments, the memory 120 stores processing logic instructions, constant values, variable values during execution of portions of applications or other processing logic, or other desired information. For example, in various embodiments, parts of control logic to perform one or more operations on the CPU reside within the memory 120 during execution of the respective portions of the operation by the CPU. During execution, respective applications, operating system functions, processing logic commands, and system software reside in the memory 120. Control logic commands that are fundamental to operating system 130 generally reside in the memory 120 during execution. In some embodiments, other software commands (e.g., a set of instructions or commands used to implement the device driver 134) also reside in the memory 120 during execution of processing system 100.

The scheduler 104 is a set of circuitry that manages scheduling of wavefronts at the parallel processor 114. In response to the CP 102 storing a wavefront at the wavefront queue 106, the scheduler 104 determines, based on a specified scheduling protocol, a subset of the CUs 116 to execute the wavefront. In some embodiments, a given wavefront is scheduled for execution at multiple compute units. That is, the scheduler 104 schedules the wavefront for execution at a subset of compute units, wherein the subset includes a plurality of compute units, with each compute unit executing a similar set of operations. The scheduler 104 further allocates a subset of the resources 128 for use by the wavefront. The parallel processor 114 is thereby able to support execution of wavefronts for large sets of data, such as data sets larger than the number of processing elements of an individual compute unit.

As noted above, the scheduler 104 selects the particular subset of CUs 116 to execute a wavefront based on a specified scheduling protocol. The scheduling protocol depends on one or more of the configuration and type of the parallel processor 114, the types of programs being executed by the associated processing system 100, the types of commands received at the CP 102, and the like, or any combination thereof. In different embodiments, the scheduling protocol incorporates one or more of a number of selection criteria, including the availability of a given subset of compute units (e.g., whether the subset of compute units is executing a wavefront), how soon the subset of compute units is expected to finish executing a currently-executing wavefront, a specified power budget of the processing system 100 that governs the number of CUs 116 that are permitted to be active, the types of operations to be executed by the wavefront, the availability of resources 128 of the parallel processor 114, and the like.

The scheduler 104 further governs the timing, or schedule, of when each wavefront is executed at the compute units 116. For example, in some cases the scheduler 104 identifies that a wavefront (such as wavefront-1 108) is to be executed at a subset of compute units that are currently executing another wavefront (such as wavefront-2 110). The scheduler 104 monitors the subset of compute units to determine when the compute units have completed execution of wavefront-2 110. In response to wavefront-2 110 completing execution, the scheduler 104 provides wavefront-1 108 to the subset of compute units, thereby initiating execution of wavefront-1 108 at the subset of compute units.

To facilitate more efficient scheduling of wavefronts at the parallel processor 114, the processing system 100 includes a garbage collecting wavefront (GCWF) 112. The GCWF is programmed to identify and deallocate resources of the parallel processor 114 that are no longer being used (referred to as "dead resources" 118) by wavefronts that are still executing at the parallel processor 114. In some embodiments, the compiler 132 generates the GCWF 112, programming the GCWF 112 to have information regarding the resource requirements of the other wavefronts, e.g., wavefront-1 108, wavefront-2 110, of the workgroup 140 and specifies the program counter 126 after which there will be a permanent drop in resource requirements for the other wavefronts.

When executed, the GCWF 112 periodically queries the program counters 126 to identify when each of wavefront-1 108 and wavefront-2 110 have completed using at least a subset of the resources 128. In response to identifying dead resources 118, the GCWF sends a command 138 to the scheduler 104 (or other resource allocation unit) to release the dead resources 118. In response to receiving the command 138, the scheduler 104 releases the dead resources 118. The dispatcher 136 updates the list of available resources to include the dead resources 118. By releasing the dead resources 118 prior to all wavefronts of the workgroup 140 completing execution, the scheduler 104 has the opportunity to dispatch subsequent wavefronts sooner than if the scheduler 104 waits until all wavefronts of the workgroup 140 complete execution.

In some embodiments, the wavefronts of the workgroup 140 actively signal to the GCWF 112 that they no longer require certain resources of the processing system. For example, in some embodiments the standard compute wavefronts write to a shared state, such as shared register 142, that the GCWF 112 consumes, to indicate which resources they no longer require. In response to receiving the signal, the GCWF sends the command 138 to the scheduler 104 to release the dead resources.

In some embodiments, rather than sending the command 138 to the scheduler 104 each time the GCWF 112 identifies dead resources 118, the GCWF 112 batches commands 138 to the scheduler 104. For example, in some embodiments, the GCWF batches commands to the scheduler 104 in response to identifying that a threshold number of wavefronts have dead resources 118 that require resource deallocation. In other embodiments, the GCWF 112 batches commands to the scheduler 104 on a periodic basis.

In some embodiments, rather than including the GCWF 112 in the workgroup 140 with standard compute wavefronts such as wavefront-1 108 and wavefront-2 110, the scheduler 104 schedules the GCWF 112 at a specialized wavefront slot that is only used with GCWFs or at a general wavefront slot that has a bit set to indicate that it is performing garbage collection. In some embodiments, the scheduler 104 assigns a low priority to GCWF slots by scheduling GCWF slots every N cycles, where N is a number of cycles that is set empirically at dispatch based on the known frequency at which resource deallocation occurs for a given GCWF or, in other embodiments, N is a fixed value.

The GCWF 112 reallocates resources in some embodiments to defragment live resources. For example, if a wavefront is allocated to a plurality of registers that are logically or physically contiguous and the GCWF 112 identifies that the wavefront is still using only a subset of the registers that are not logically or physically contiguous, the GCWF 112 reallocates the live registers to be contiguous so that the remaining (dead) registers can be released.

Figure 2:
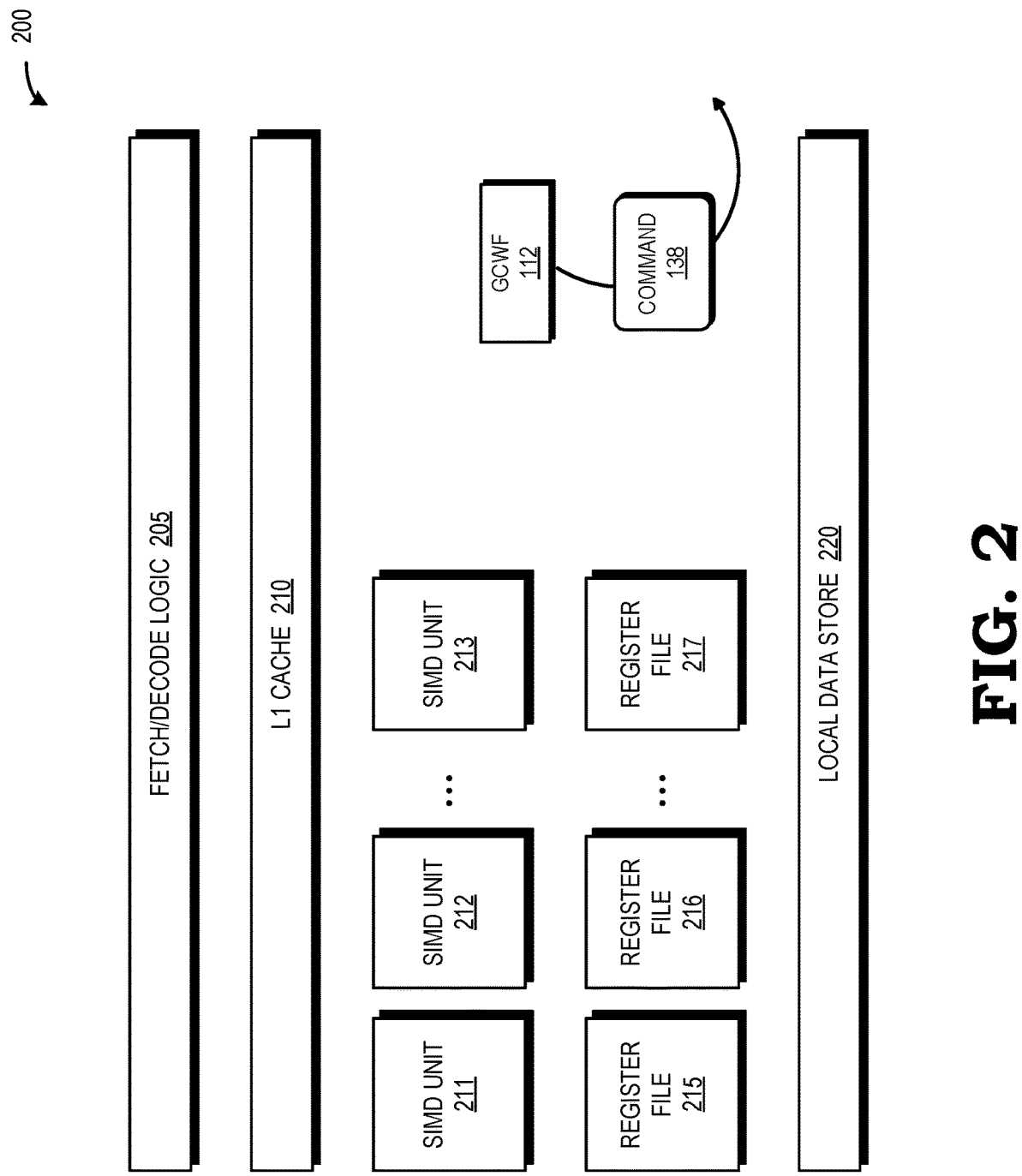
FIG. 2 is a block diagram of a parallel processor according to some embodiments.

FIG. 2 is a block diagram of a parallel processor 200 according to some embodiments. The parallel processor 200 is used to implement some embodiments of the parallel processor 114 shown in FIG. 1. The parallel processor 200 includes fetch/decode logic 205 that fetches and decodes instructions in the workgroups that are scheduled for execution by the parallel processor 200. Some embodiments of the parallel processor 200 execute threads in a workgroup. For example, the fetch/decode logic 205 can fetch a kernel of instructions that are executed by all the threads in the workgroup. The fetch/decode logic 205 then decodes the instructions in the kernel. The parallel processor 200 also includes a cache such as an L1 cache 210 that is used to store local copies of data and instructions that are used during execution of the threads in the workgroup.

A plurality of SIMD units 211, 212, 213 (collectively referred to herein as "the SIMD units 211-213") are used to execute threads of the workgroup concurrently or in parallel. For example, the SIMD units 211-213 can execute instructions in the same kernel using different input data to generate different output results. The SIMD units 211-213 are each associated with register files 215, 216, 217 (collectively referred to herein as "the register files 215-217") that are used to store information that defines a context of the corresponding SIMD units 211-213 while executing instructions in a thread. Values are stored in the register files 215-217 in response to threads being scheduled for execution on the SIMD units 211-213. The values can be modified by the SIMD units 211-213 to reflect the changing context of the SIMD units 211-213 in response to execution of instructions on the SIMD units 211-213. The values stored in the register files 215-217 are copied to an external memory (such as the memory 120 shown in FIG. 1). The values are then erased from the register files 215-217 (or written over by new context information for a different instruction or workgroup) in response to preemption of instructions or workgroups executing in the parallel processor 200. Once the values stored in the register files 215-217 have been copied to the external memory, if a wavefront will not be re-using one of the register files 215-217, the register file 215-217 can be identified by the GCWF 112 as dead.

A local data store 220 is used to store data that is generated by or used by the SIMD units 211-213. Some embodiments of the local data store 220 are partitioned to provide separate regions for each of the SIMD units 211-213. The local data store 220 is also used to facilitate exchange or sharing of data between the SIMD units 211-213. For example, producer threads generate an output and consumer threads use (or "consume") the output. Producer-consumer threads within a workgroup executing on the parallel processor 200 are able to share data via the local data store 220. Data associated with threads of a workgroup is stored in the local data store 220 in response to threads being scheduled for execution on the SIMD units 211-213. In some embodiments, the information stored in the local data store 220 is modified in response to execution of instructions by the SIMD units 211-213. Information in the local data store 220 that is associated with threads or workgroups executing on the SIMD units 211-213 is written to an external memory (such as the memory 120 shown in FIG. 1) in response to preemption of the thread or workgroup. Similar to the register files 215-217, once a wavefront will not be re-using a particular portion of the local data store 220, the GCWF 112 identifies the portion of the local data store 220 as dead and sends a command 138 to deallocate the dead portion of the local data store 220.

Figure 3:
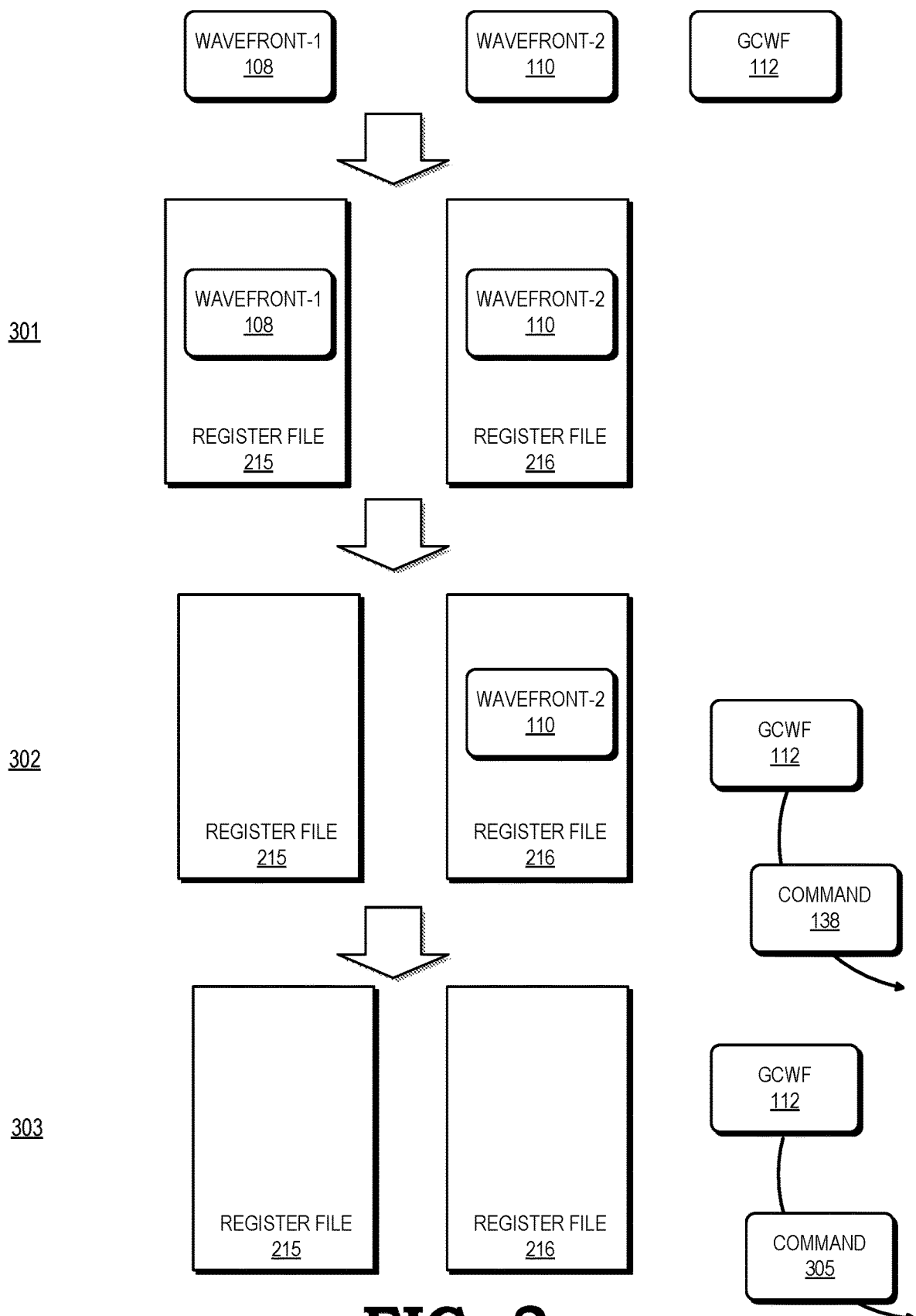
FIG. 3 is a diagram illustrating an example of the garbage collecting wavefront of FIG. 1 identifying and deallocating resources of the parallel processor that are no longer being used by a wavefront in accordance with some embodiments.

An example of the GCWF 112 identifying and deallocating dead resources based on monitoring program counters associated with executing wavefronts is illustrated at FIG. 3. In the depicted example of FIG. 3, there are two in-flight wavefronts at the parallel processor 114, designated wavefront-1 108 and wavefront-2 110. At a time 301, based on compiler information regarding the timing of resource use of the in-flight wavefronts and querying program counters (not shown), the GCWF 112 identifies that wavefront-1 108 is actively using register file 215, and wavefront-2 110 is actively using register file 216. At time 302, the GCWF 112 identifies that wavefront-1 108 has completed using register file 215, and wavefront-2 110 is still actively using register file 216. In response to identifying that register file 215 is no longer being actively used by wavefront-1 108, the GCWF 112 sends a command 138 to the scheduler (not shown) to deallocate register file 215 from wavefront-1 108.

At time 303, the GCWF 112 identifies that the wavefront-2 110 is no longer using register file 216. In response to identifying that register file 216 is no longer being actively used by wavefront-2 110, the GCWF 112 sends a command 305 to the scheduler to deallocate register file 216 from wavefront-2 110.

Thus, the GCWF 112 dynamically manages the deallocation of dead resources at the parallel processor 114 by identifying and commanding the deallocation of dead resources while a workgroup is still executing at the parallel processor 114. The GCWF 112 thereby supports low execution latency for active wavefronts by proactively freeing resources that are no longer being used.

Figure 4:
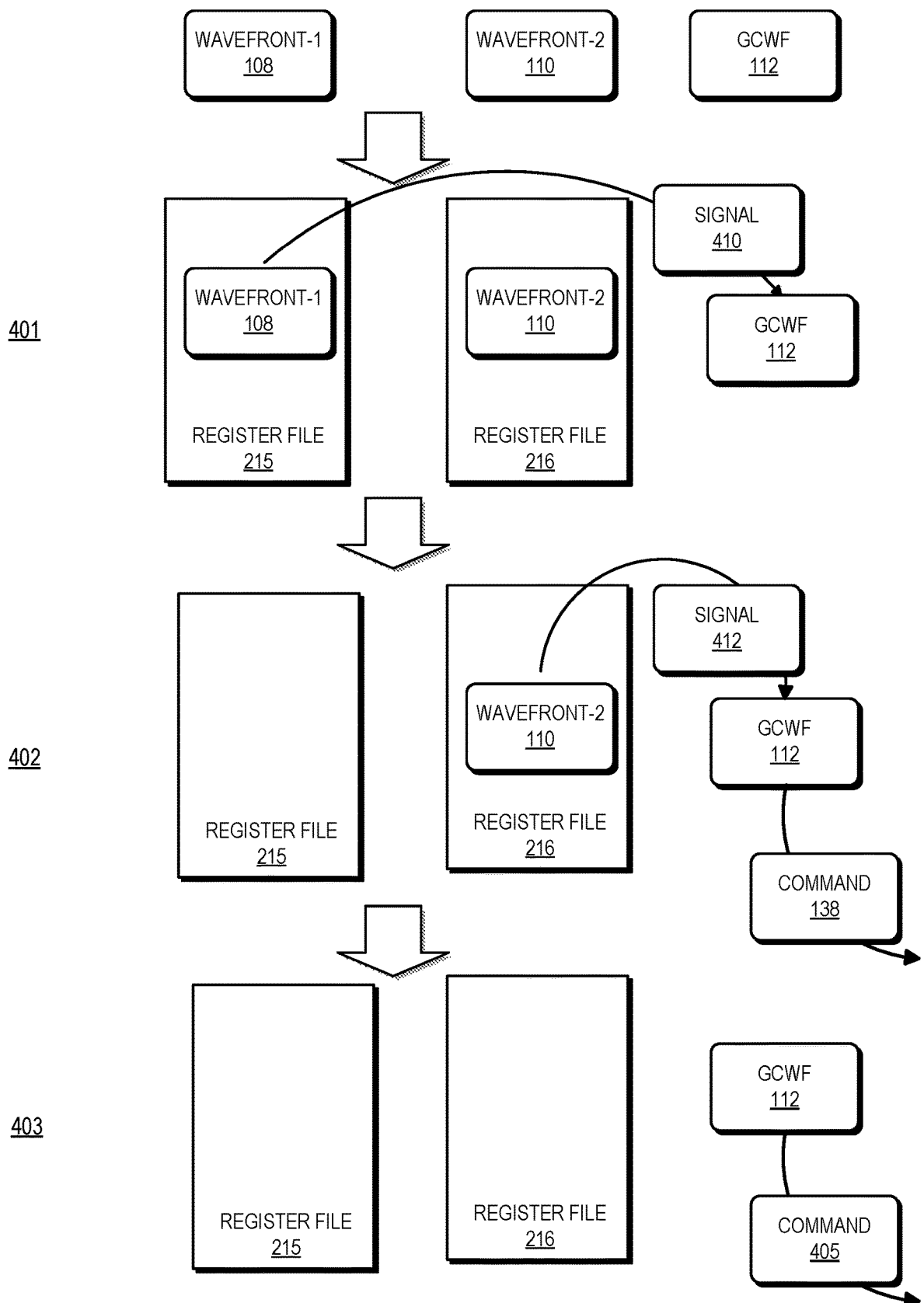
FIG. 4 is a diagram illustrating an example of the garbage collecting wavefront of FIG. 1 identifying and deallocating dead resources based on signals from other wavefronts of a workgroup in accordance with some embodiments.

An example of the GCWF 112 identifying and deallocating dead resources based on signals received from executing wavefronts is illustrated at FIG. 4. The instruction set architecture of the processing system 100 determines the method by which the executing wavefronts communicate signals to the GCWF 112. In the depicted example of FIG. 4, there are two in-flight wavefronts at the parallel processor 114, designated wavefront-1 108 and wavefront-2 110. At a time 401, wavefront-1 108 is actively using register file 215, and wavefront-2 110 is actively using register file 216. Wavefront-1 108 sends a signal 410 to the GCWF 112 indicating that wavefront-1 108 is completing using register file 215. In some embodiments, the signal 410 is a bit corresponding to the wavefront-1 108 that the wavefront-1 108 sets at, e.g., a register (not shown) allocated to the GCWF 112, to indicate that the wavefront-1 108 is ready for garbage collection. In some embodiments, the signal 410 wakes the GCWF 112, and in other embodiments, the GCWF 112 polls the executing wavefronts to determine if the bit is set.

At time 402, wavefront-1 108 has completed using register file 215, and wavefront-2 110 is completing using register file 216. Wavefront-2 110 sends a signal 412 to the GCWF 112 indicating that wavefront-2 110 is completing using register file 216. In response to receiving the signal 410 at time 401 indicating that wavefront-1 108 has completed using register file 215, at time 402 the GCWF 112 sends a command 138 to the scheduler (not shown) to deallocate register file 215 from wavefront-1 108.

In response to receiving the signal 412 at time 402 indicating that wavefront-2 110 has completed using register file 216, at time 403 the GCWF 112 sends a command 405 to the scheduler to deallocate register file 215 from wavefront-1 108. In some embodiments, rather than sending two separate commands 138, 405 at times 402, 403, the GCWF 112 batches the commands 138, 405 and sends both at time 403 to avoid serializing commands to the scheduler 104.

Figure 5:
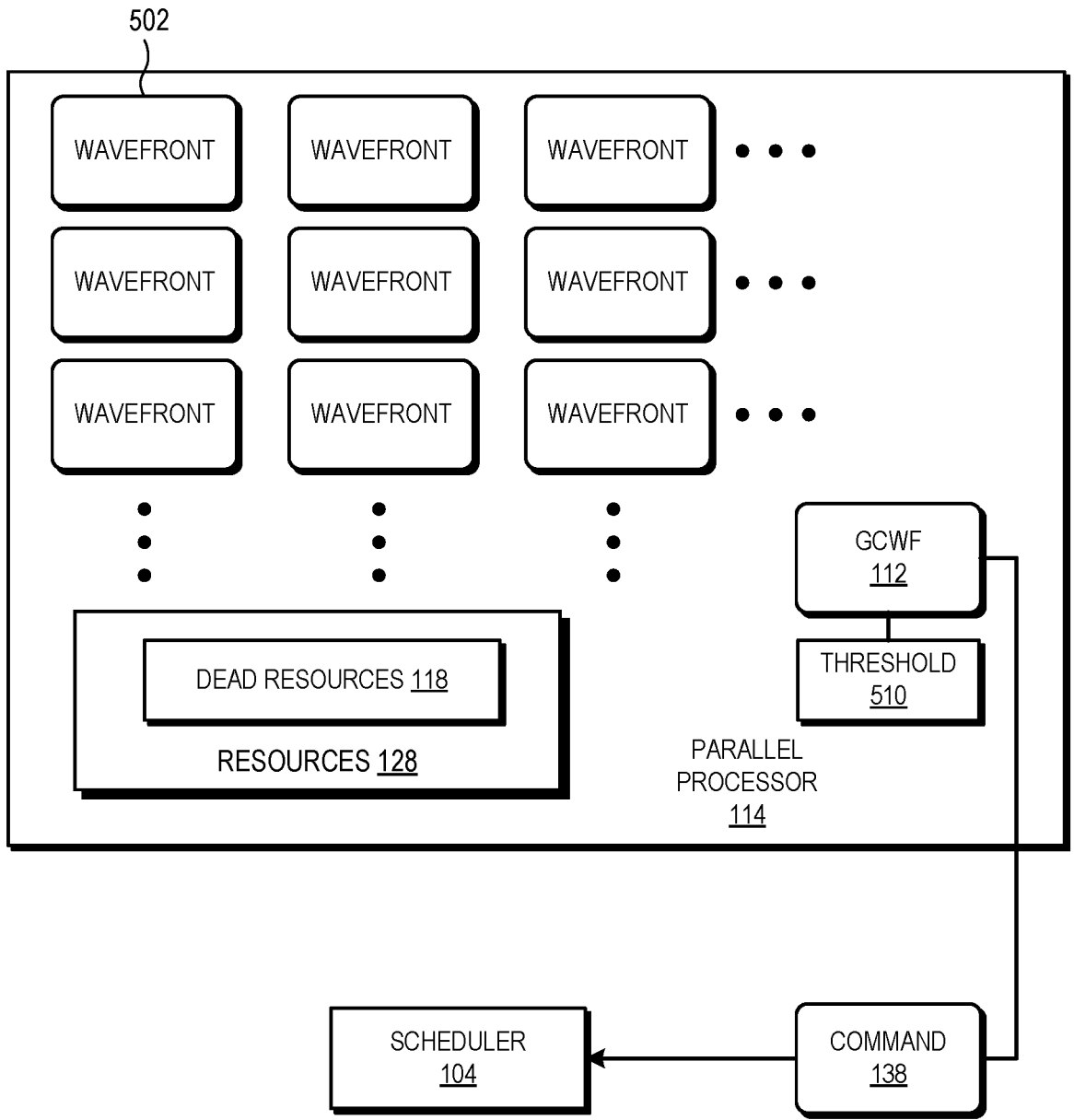
FIG. 5 is a block diagram of the garbage collecting wavefront of FIG. 1 identifying that a threshold number of wavefronts have completed using resources of the parallel processor in accordance with some embodiments.

An example of the GCWF 112 batching commands to deallocate dead resources is illustrated at FIG. 5. In the depicted example of FIG. 5, there are numerous wavefronts, such as wavefront 502, executing at the parallel processor 114. The GCWF 112 tracks the use of resources 128 of the parallel processor 114 by the wavefronts 502. Instead of sending a command 138 to deallocate dead resources 118 each time the GCWF 112 identifies dead resources 118, the GCWF 112 batches commands 138 to deallocate the dead resources 118 based on a threshold 510. In some embodiments, the threshold 510 is a number of wavefronts that have completed execution and in other embodiments, the threshold 510 is a quantity of dead resources 118 that the GCWF 112 has identified. In some embodiments, the threshold 510 is an amount of elapsed time since the wavefronts 502 started execution. The threshold 510 is fixed in some embodiments, and in other embodiments, the threshold 510 is heuristically adjustable based on characteristics of the workgroup.

Figure 6:
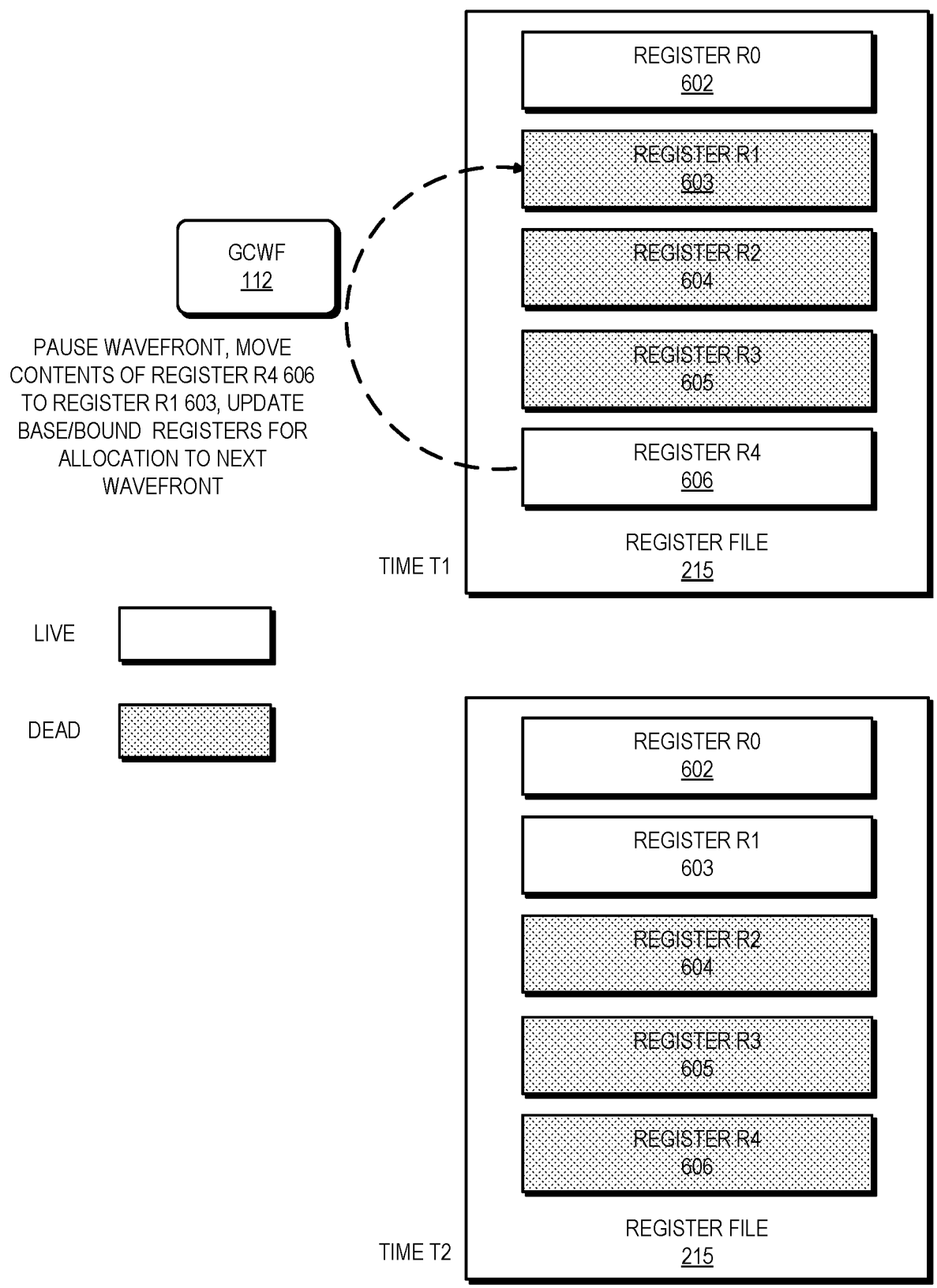
FIG. 6 is a block diagram of the garbage collecting wavefront of FIG. 1 defragmenting dead resources in accordance with some embodiments.

An example of the GCWF 112 defragmenting dead resources is illustrated in FIG. 6. In the depicted example of FIG. 6, wavefront-1 108 (not shown) has been allocated five registers, R0 602, R1 603, R2 604, R3 605, and R4 606. At a time T1, the GCWF 112 determines that registers R0 602 and R4 606 are live and registers R1 603, R2 604, R3 605 are dead. Although the GCWF 112 can free registers R1 603, R2 604, R3 605, allocation of resources is generally performed in a coarse-grained manner according to base/bounds, e.g., base=register R0 602 and bound=register R4 606.

To facilitate release of contiguous resources, the GCWF 112 pauses wavefront-1 108 and moves the value stored at register R4 606 to register R1 603. At a time T2, the GCWF 112 then updates the base/bound registers for the wavefront to base=register R0 602 and bound=register R1 603. In some embodiments, the GCWF 112 reallocates the registers itself and in other embodiments the GCWF 112 provides information to the scheduler 104 to perform the reallocation. The compiler (not shown) ensures that reads to the value in register R4 606 will read from register R1 603 after the reallocation has occurred. The compiler additionally ensures that registers R2, 604, R3 605, and R4 606 are no longer available to wavefront-1 108 after the reallocation has occurred. Although in the illustrated example the resources are registers, in other embodiments, the GCWF 112 applies a similar method to defragment other resources, such as scratch pad memory.

Figure 7:
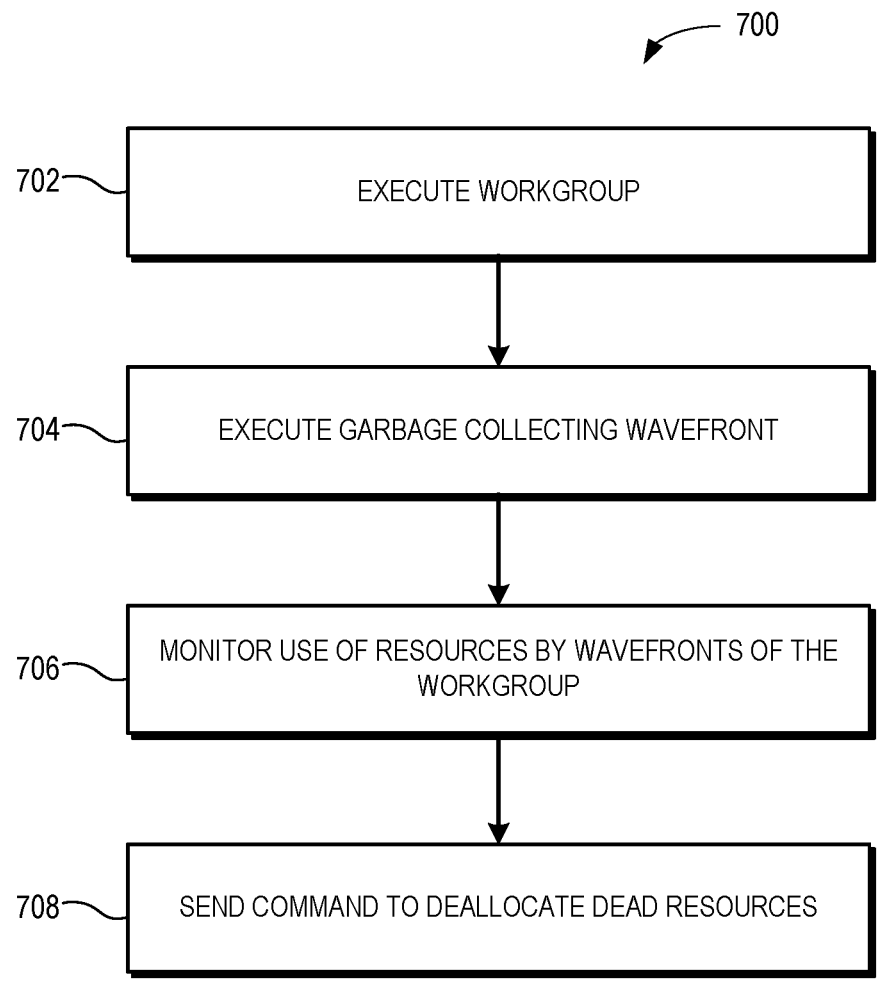
FIG. 7 is a flow diagram illustrating a method for executing a garbage collecting wavefront to identify and deallocate resources of a parallel processor that are no longer being used by a wavefront in accordance with some embodiments.

FIG. 7 is a flow diagram illustrating a method 700 for executing a GCWF 112 to identify and deallocate dead resources 118 of the parallel processor 114 in accordance with some embodiments. The method 700 is described with respect to an example implementation at the processing system 100 of FIG. 1. At block 702, the scheduler 104 dispatches the workgroup 140, including wavefront-1 108 and wavefront-2 110, to execute at the parallel processor 114. In some embodiments, the GCWF 112 is included in the workgroup 140 and executes in parallel with wavefront-1 108 and wavefront-2 110. In other embodiments, the scheduler 104 dispatches the GCWF 112 separately from the workgroup 140 in a time slot reserved for garbage collecting wavefronts, at block 704.

At block 706, the GCWF 112 monitors use of resources by wavefronts of the workgroup 140. For example, in some embodiments, the GCWF 112 is programmed by the compiler 132 and, based on knowledge of the compiler 132 of the resources 128 that will be used by each of the wavefronts of the workgroup 140, the GCWF 112 queries the program counters 126 to determine when each of the wavefronts 108, 110 have completed using at least a subset of the resources 128. At block 708, in response to identifying dead resources 118, the GCWF 112 sends a command 138 to the scheduler 104 to deallocate the dead resources 118. In some embodiments, if the dead resources 118 to be deallocated are not contiguous, the compiler 132 forces a reallocation of the dead resources to make them contiguous.

Figure 8:
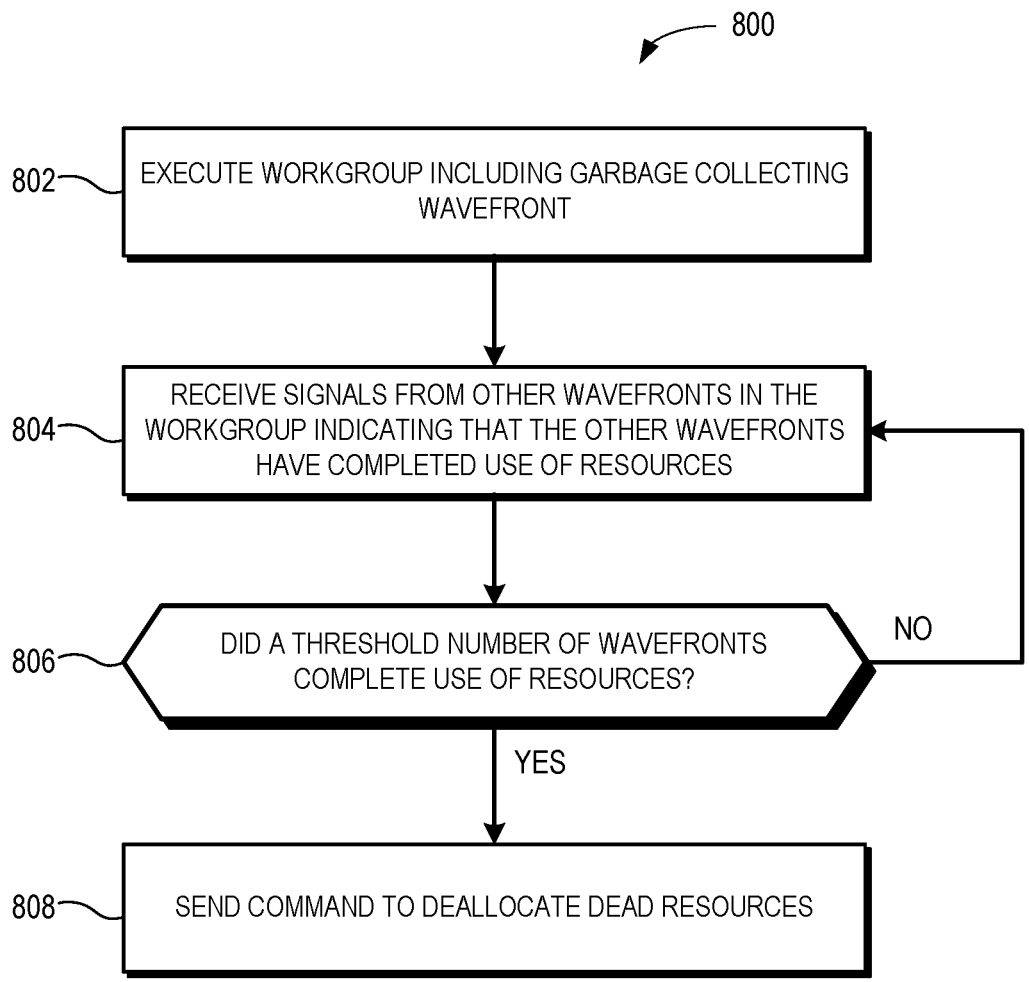
FIG. 8 is a flow diagram illustrating a method for wavefronts of a workgroup to signal a garbage collecting wavefront that they are no longer using resources of a parallel processor in accordance with some embodiments.

FIG. 8 is a flow diagram illustrating a method 800 for wavefronts of a workgroup to signal a garbage collecting wavefront that they are no longer using resources of the parallel processor 114 in accordance with some embodiments. The method 800 is described with respect to an example implementation at the processing system 100 of FIG. 1. At block 802, the scheduler 104 dispatches the workgroup 140, including wavefront-1 108, wavefront-2 110, and GCWF 112, to execute at the parallel processor 114. At block 804, the GCWF 112 receives signals 410, 412 from the standard compute wavefronts in the workgroup 140, such as wavefront-1 108 and wavefront-2 110, indicating that the standard compute wavefronts have completed use of at least a subset of the resources 128. In some embodiments, the standard compute wavefronts send the signals 410, 412 by writing to a register that is accessed by the GCWF 112.

At block 806, the GCWF 112 determines whether there are sufficient dead resources 118 to deallocate based on a threshold 510. In some embodiments, the threshold 510 is a number of wavefronts that have completed execution and in other embodiments, the threshold 510 is a quantity of dead resources 118 that the GCWF 112 has identified. In some embodiments, the threshold 510 is an amount of elapsed time since the wavefronts 502 started execution. The threshold 510 is fixed in some embodiments, and in other embodiments, the threshold 510 is heuristically adjustable based on characteristics of the workgroup. In the embodiment illustrated in FIG. 8, the threshold 510 is a number of wavefronts that have completed use of resources 128.

If, at block 806, the GCWF 112 determines that the threshold 510 has not been met, the method flow continues back to block 704. If, at block 806, the GCWF 112 determines that the threshold 510 has been met, the method flock continues to block 708. At block 808, the GCWF 112 sends a command 138 to the scheduler 104 to deallocate the dead resources 118.

Figure 9:
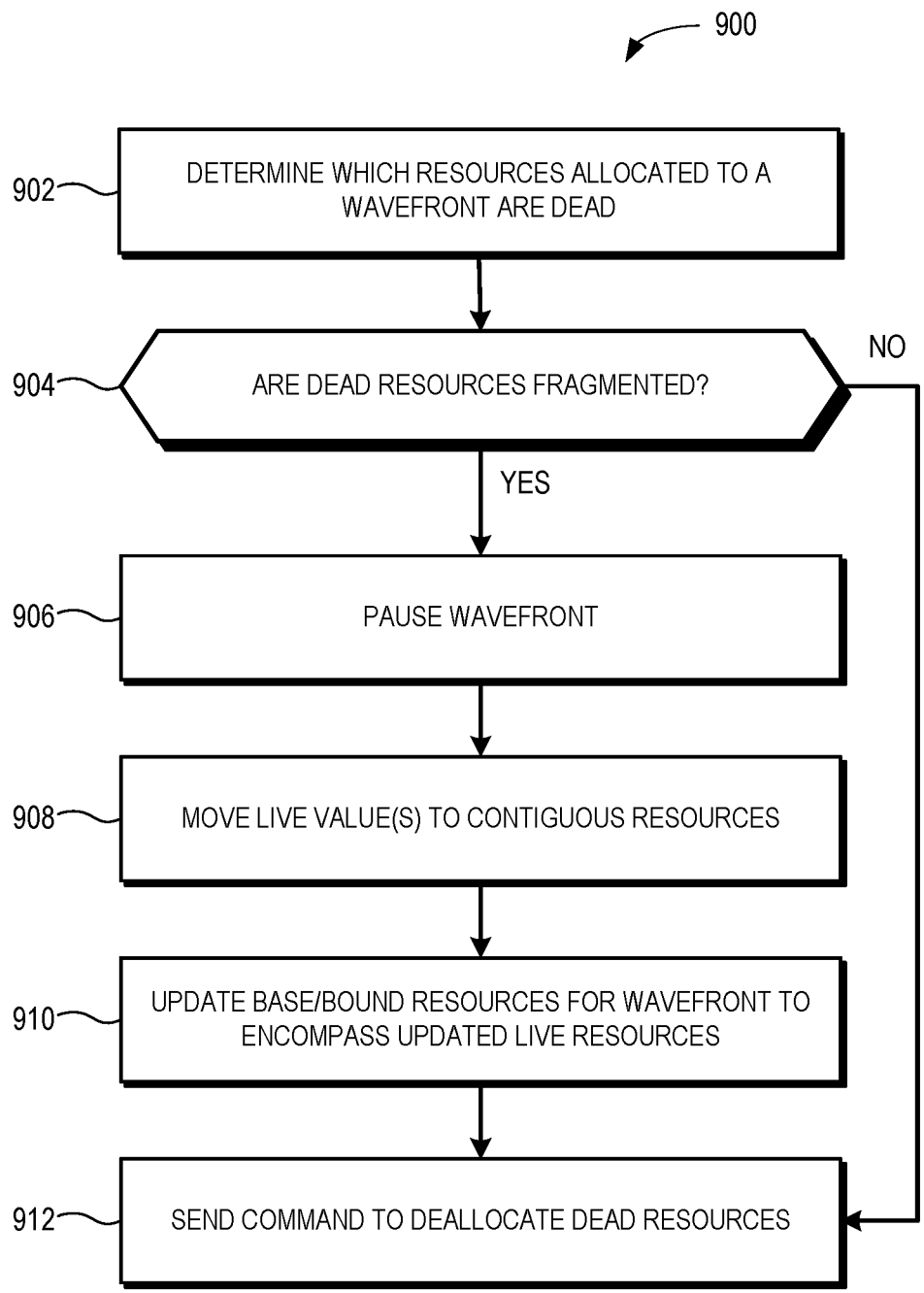
FIG. 9 is a flow diagram illustrating a method for defragmenting dead resources identified by a garbage collecting wavefront in accordance with some embodiments.

FIG. 9 is a flow diagram illustrating a method 900 for defragmenting dead resources identified by a garbage collecting wavefront in accordance with some embodiments. The method 900 is described with respect to an example implementation at the processing system 100 of FIG. 1. At block 902, the GCWF 112 determines which resources allocated to a wavefront are dead. At block 904, the GCWF 112 determines whether the dead resources are fragmented. For example, if the wavefront is allocated five registers, R0 602, R1 603, R2 604, R3 605, and R4 606, and the GCWF 112 determines that registers R0 602 and R4 606 are live and registers R1 603, R2 604, R3 605 are dead, the GCWF determines that the dead resources are fragmented. If the GCWF 112 determines that the dead resources are fragmented, the method flow continues to block 906. At block 906, the GCWF 112 pauses execution of the wavefront. At block 908, the GCWF 112 moves the values stored at the live resources to contiguous resources. For example, if the GCWF 112 determines that registers R0 602 and R4 606 are live and registers R1 603, R2 604, R3 605 are dead, the GCWF 112 moves the value stored at register R4 606 to register R1 603 so that contiguous registers R0 602 and R1 603 are live and registers R2 604, R3 605, and R4 606 are dead.

At block 910, the GCWF 112 updates the base/bound allocated to the wavefront to encompass the updated live resources. For example, after moving the value stored at register R4 606 to register R1 603, the GCWF updates the base to R0 602 and the bound to R1 603. At block 912, the GCWF 112 sends a command to deallocate the updated dead resources. For example, after moving the value stored at register R4 606 to register R1 603, the GCWF sends a command to release registers R2 604, R3 605, and R4 606 so they can be allocated to another wavefront.

In some embodiments, the apparatus and techniques described above are implemented in a system including one or more integrated circuit (IC) devices (also referred to as integrated circuit packages or microchips), such as the processing system described above with reference to FIGS. 1-9. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   executing a garbage collecting wavefront (GCWF) programmed with information regarding resource requirements of other wavefronts of a workgroup;
   querying program counters of the other wavefronts of the workgroup, wherein each program counter of a corresponding wavefront specifies a point after which respective resources will no longer be used by the corresponding wavefront; and
   sending a command to release dead resources of a parallel processor of a processing system that are allocated to the workgroup and that are no longer being used by the other wavefronts of the workgroup prior to the workgroup completing execution at the parallel processor based on the information, execution timing of the other wavefronts, and the program counters.

2. The method of claim 1, further comprising:
   releasing the dead resources from allocation to the workgroup responsive to the command.

3. The method of claim 2, wherein the GCWF is included in the workgroup.

4. The method of claim 1, wherein sending the command comprises sending the command to a resource allocation unit of the processing system to release the dead resources from allocation to the workgroup.

5. The method of claim 4, wherein sending the command to release the dead resources is in response to a threshold number of wavefronts of the other wavefronts completing use of the dead resources.

6. The method of claim 1, further comprising:
   receiving, at the GCWF, a signal from a first wavefront of the workgroup executing concurrently with the GCWF, the signal indicating that the first wavefront has completed use of a resource.

7. The method of claim 1, further comprising:
   re-executing the GCWF every N cycles, wherein N is a number of cycles that is based on a frequency at which resource deallocation occurs for a given GCWF.

8. The method of claim 1, further comprising:
   defragmenting dead resources allocated to a first wavefront of the workgroup in response to the dead resources allocated to the first wavefront being non-contiguous.

9. A method, comprising:
   executing, at a parallel processor of a processing system, a first wavefront as part of a workgroup comprising a plurality of wavefronts, wherein the first wavefront is programmed with information regarding resource requirements of the other wavefronts of the workgroup;
   querying a program counter of a second wavefront of the workgroup, wherein the program counter specifies a point after which resources will no longer be used by the second wavefront; and
   sending a command to release dead resources of the parallel processor allocated to the workgroup that are no longer being used by the second wavefront prior to the workgroup completing execution at the parallel processor based on the information, execution timing of the other wavefronts, and the program counter.

10. The method of claim 9, wherein the resources comprise register files that do not hold values that will be consumed by the second wavefront.

11. The method of claim 9, further comprising:
    releasing the resources from allocation to the workgroup responsive to the command.

12. The method of claim 9, further comprising:
    programming the first wavefront based on compiler information regarding timing of resource use by the other wavefronts of the workgroup.

13. The method of claim 9, further comprising:
    receiving, at the first wavefront, a signal from the second wavefront, the signal indicating that the second wavefront has completed use of a resource.

14. The method of claim 9, further comprising:
    signaling for the resources to be deallocated in response to a threshold number of wavefronts of the other wavefronts of the workgroup completing use of the resources.

15. The method of claim 9, further comprising:
    re-executing the first wavefront every N cycles, wherein N is a number of cycles that is based on a frequency at which resource deallocation occurs for the first wavefront.

16. The method of claim 9, further comprising:
    in response to the resources not being contiguous, defragmenting the resources.

17. A device, comprising:
    a processor to:
       execute a first wavefront comprising a set of instructions programmed with information regarding resource requirements of other wavefronts of a workgroup comprising the first wavefront;
       query program counters of the other wavefronts of the workgroup, wherein each program counter of a corresponding wavefront specifies a point after which respective resources will no longer be used by the corresponding wavefront; and
       send a command to release dead resources of a parallel processor of a processing system that are allocated to the workgroup and that are no longer being used by the other wavefronts of the workgroup prior to the workgroup completing execution at the parallel processor based on the information, execution timing of the other wavefronts, and the program counters.

18. The device of claim 17, wherein the dead resources comprise register files that do not hold values that will be consumed by a second wavefront of the workgroup.

19. The device of claim 17, wherein the processor is to:
    release the dead resources from allocation to the workgroup in response to the command.

20. The device of claim 17, wherein the processor is to:
    program the first wavefront based on compiler information regarding timing of resource use by a plurality of wavefronts of the workgroup.

21. The device of claim 17, wherein the processor is to:
    receive, at the first wavefront, a signal from a second wavefront of the workgroup executing concurrently with the first wavefront, the signal indicating that the second wavefront has completed use of a resource.

22. The device of claim 17, wherein the processor is to:
    send the command to deallocate the dead resources in response to a threshold number of wavefronts of the other wavefronts completing use of the dead resources.

23. The device of claim 17, wherein the processor to:
defragment the dead resources in response to the dead resources being fragmented.

\* \* \* \* \*